United States Patent
Yamaguchi et al.

(10) Patent No.: US 6,500,902 B2
(45) Date of Patent: Dec. 31, 2002

(54) FITTING COMPOSITION, BODY-WORN TOOL PRODUCED USING THE SAME, AND METHOD FOR PRODUCING THE SAME

(75) Inventors: Satoshi Yamaguchi, Osaka (JP); Junichi Yamauchi, Osaka (JP); Kenji Hatanaka, Okayama (JP); Mizuho Maeda, Ibaraki (JP); Eiichi Masuhara, Tokyo (JP)

(73) Assignees: Kuraray Co., Ltd., Kurashiki (JP); Japan Institute of Advanced Dentistry, Tokyo (JP)

( * ) Notice: Subject to any disclaimer, the term of this patent is extended or adjusted under 35 U.S.C. 154(b) by 4 days.

(21) Appl. No.: 09/885,116

(22) Filed: Jun. 21, 2001

(65) Prior Publication Data

US 2002/0016417 A1 Feb. 7, 2002

(30) Foreign Application Priority Data

Jun. 22, 2000 (JP) ........................................ 2000-187637

(51) Int. Cl.$^7$ .............................. C08F 4/00; C08L 53/02
(52) U.S. Cl. ...................... 525/244; 525/32 A; 525/69; 525/262; 525/263
(58) Field of Search ............................... 525/244, 92 A, 525/262, 263, 69

(56) References Cited

U.S. PATENT DOCUMENTS

| | | |
|---|---|---|
| 359,345 A | 3/1887 | Burton |
| 4,598,123 A | 7/1986 | Cutter |
| 4,951,656 A * | 8/1990 | Gorka et al. ................. 525/314 |

FOREIGN PATENT DOCUMENTS

| | | |
|---|---|---|
| EP | 0 238 863 | 9/1987 |
| GB | 1 514 005 | 6/1978 |
| JP | 61-296900 | 12/1986 |
| JP | 5-130697 | 5/1993 |
| JP | 9-67223 | 3/1997 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

A fitting composition capable of fitting a body-worn tool to be used in contact with skin, such as spectacles, a hearing aid, and an artificial limb, suitably to the body shape of individual wearer and thereby realizing the function of the body-worn tool in a steady state, as well as providing an excellent wear-feeling, a body-worn tool produced using the same, and a method of producing the same. The fitting composition for body-worn tools to be used in contact with skin including (a) a thermoplastic block copolymer having at least one polymer block (A) mainly composed of an aromatic vinyl compound and at least one elastic polymer block (B); (b) a (meth)acrylic monomer; and (c) a polymerization initiator.

12 Claims, No Drawings

FITTING COMPOSITION, BODY-WORN TOOL PRODUCED USING THE SAME, AND METHOD FOR PRODUCING THE SAME

SUMMARY OF THE INVENTION

The present invention relates to a fitting composition for a body-worn tool to be used in contact with skin, a body-worn tool produced by using the fitting composition, and a method of producing the body-worn tool. More particularly, the invention relates to a fitting composition capable of fitting a body-worn tool to be used in contact with skin, such as spectacles, a hearing aid, and an artificial limb, suitably to the body shape of individual wearer and thereby realizing the function of the body-worn tool in a steady state, as well as providing an excellent wear-feeling. The present invention also provides a body-worn tool to be used in contact with skin, which is produced by using the fitting composition and a method of producing the body-worn tool. The fitting composition of the invention has generally a paste form and is excellent in the handling, and thus it is possible to produce a part directly by subjecting the composition to a wearer to whom the tool is attached and hardening the composition through polymerization. Alternatively, the molded article (hardened product) can also be formed extremely easily to a desired shape which fits the body shape of a wearer by hardening the composition through polymerization using a mold prepared beforehand with modeling the body shape.

BACKGROUND ART

Since body-worn tools such as a hearing aid, spectacles, and an artificial limb are directly attached to the bodies of individual wearers, stability at the wear, sufficient realization of the function of the tools, and good wear-feeling without sense of discomfort are required. For example, a hearing aid is an apparatus for helping hearing ability which is decreased owing to conductive disorder caused by tympanitis or tympanic damage, perceptive disorder caused by the disorder of perceptive organs such as inner ear, or mixed deafness complicated by these symptoms. The types of the hearing aid include an ear-hole type, an ear-hanging type, a pocket type, and a spectacle type.

Among them, the ear-hole type hearing aid has widely used in recent years since it has an excellent characteristics that it can be included in the ear hole of a wearer and thus is compact and inconspicuous, as well as it provides natural hearings. As the methods for producing the ear-hole type hearing aid, the following methods (1) and (2) are hitherto known, for example.

(1) A method for completing the production of a hearing aid comprising the steps of making a cast of the ear hole of a wearer by inserting a silicone putty material or the like into the ear hole; preparing a female mold having an ear hole-shape cavity by applying agar, gypsum, or other molding material to the outer surface of the cast and solidifying the material; forming a wall by applying a thermally fusible material to the inner surface of the female mold at a predetermined thickness and solidifying the material; forming an intermediate by filling the inside of the solidified wall of the thermally fusible material with a resin and solidifying or hardening the resin, removing the wall made of the thermally fusible material applied between the female mold and the intermediate; preparing a shell for the hearing aid by introducing a soft resin such as plasticized polyvinyl chloride resin into the cavity for forming the shell formed by the removal of the wall between the female mold and the intermediate and solidifying the resin; installing a hardware circuit board for the hearing aid inside the shell; and adjusting the shape (Japanese Patent Laid-Open No. 296900/1986).

(2) A method for completing the production of a hearing aid comprising the steps of making a cast of the ear hole of a wearer by inserting a silicone putty material or the like into the ear hole; preparing a female mold having an ear hole-shape cavity by applying a light-transparent resin material to the outer surface of the cast and solidifying the material; preparing a shell for the hearing aid having a predetermined thickness by introducing a acrylic photosetting resin material into the inner surface of the female mold and hardening the photosetting resin material through irradiation with a light from the outside of the female mold; installing a hardware circuit board for the hearing aid inside the shell; and adjusting the shape (Japanese Patent Laid-Open No. 130697/1993).

The hearing aid having a shell made of plasticized vinyl chloride resin prepared by the above method (1) is soft to the ear hole owing to the softness of the material, but its fitness to the ear hole is not accurate and its deformation is easy. Therefore, it has problems that it easily loosens and comes off the ear hole during its use and howling (acoustic feedback) tends to occur owing to acoustic leakage. Thus, the hearing aid is disadvantageous that, at every time when such problems occur, the shape of the shell should be adjusted or the implanted position of the hardware circuit board of the hearing aid should be controlled after opening of the shell. Further, in the case that such adjustment does not solve the howling problem, it is necessary to lower the output of the hearing aid hardware in order to prevent the acoustic leakage. However, when the output of the hearing aid hardware is lowered, performance of the hearing aid decreases, and sometimes, it becomes impossible to enhance the hearing ability as the wearer desires. Also, the hearing aid prepared by the above method (2) is hard and is difficult to fit well to t he ear hole of the wearer, and has inferior wear-feeling because the shell is made of a photo-cured acrylic resin Furthermore, it is disadvantageous that it easily comes off the ear hole during its use and howling tends to occur owing to acoustic leakage. Therefore, it is also necessary for this hearing aid to adjust the shape of the shell or to control the implanted position of the hardware circuit board of the hearing aid in the shell. In the case that such adjustment does not solve the howling problem, it becomes necessary to lower the output of the hearing aid hardware, whereby the hearing aid ma y not fulfill its function.

Moreover, for the purpose of preventing slippage of spectacles and maintaining the lenses a t the optimum position for correcting eyesight, fitting members are generally attached to the nose-fitting part of spectacles or ear-hanging part of the bows. However, conventional fitting members attached to spectacles have defects that the spectacles tend to slip or come off since the members are generally hard and difficult to fit to the body(face) of a wearer. When the spectacles slip out of the proper position, it becomes difficult to maintain the lenses at the optimum position, so that eyesight is not sufficiently corrected and, in some case, eye fatigue, headache, further decrease of eyesight, and the like may occur. Furthermore, in other body-worn tools such as an artificial limb, inadequate fitting of the limb to the body parts to which the tools are attached may realize insufficient function of the limb, and may give physical pain in some cases.

Object of the invention is to provide a fitting composition capable of fitting a body-worn tool to be used in contact with skin, such as spectacles, a hearing aid, and an artificial limb, suitably to the body shape of individual wearer without slippage at the body part or coming off the body part to which the tool is attached and thereby realizing sufficiently the original function of the body-worn tool in a steady state, as well as providing an excellent wear-feeling by absorbing many kinds of impact pressure generated. More specifically, in the case of use for a hearing aid, for example, object thereof is to provide a fitting composition capable of producing a hearing aid having a high fitting accuracy to ear hole or the like without coming off through loosening during the use or without occurrence of excessive deformation and with no occurrence of howling owing to acoustic leakage, and providing an excellent wear-feeling. In the case of use for spectacles, for example, it is to provide a fitting composition capable of preventing slippage or coming off of the spectacles and maintaining the lenses at a proper position for correction eyesight without occurrence of eye fatigue, headache, decrease of eyesight, and the like. In the case of using for an artificial limb, for example, it is to provide a fitting composition capable of adequately fitting the limb to the body parts to which the limb is attached, realizing sufficient function of the limb, and providing an excellent wear-feeling without giving physical pain through absorbing many kinds of impact pressure generated.

Furthermore, other objects of the invention are to provide a body-worn tool excellent in compatibility and wear-feeling, which is prepared by using a fitting composition excellent in handling ability at preparing the body-worn tool and capable of forming easily a polymerized hardened product that fits well the body shape of wearer without carrying out complex processes, and to provide a method of producing the same.

SUMMARY OF THE INVENTION

The present inventors have extensively studied for achieving the above objects. As a result, they have found that, at the production of body-worn tools such as a hearing aid, spectacles, an artificial limb, and the like, the use of a composition containing a thermoplastic block copolymer comprising a specific polymer block mainly composed of an aromatic vinyl compound and an elastic polymer block; a (meth)acrylate monomer; and a polymerization initiator allows good fitting of each body-worn tool to the body shape of individual wearer without occurrence of slippage and coming off, and thereby, the original function of the body-worn tools can be realized in a steady state and further good wear-feeling is provided.

More specifically, when a hearing aid is produced using the above composition, they have found that the hearing aid has a high fitting accuracy to ear hole or the like without coming off through loosening during the use or without occurrence of excessive deformation as well as with no occurrence of howling owing to acoustic leakage, and an excellent wear-feeling is provided. Also, when nose-fitting parts of spectacles are prepared or slippage-preventing members at their bows are formed using the above composition, they have found that the slippage or coming off of the spectacles can be prevented to maintain the lenses at a proper position for correction eyesight and it is also possible to prevent eye fatigue, headache, decrease of eyesight, and the like owing to slippage of the lenses. In the case of using the above composition for an artificial limb, they have found that the use allows good fitting of the limb to the body parts to which the limb is attached, and realization of full function of the limb, with an excellent wear-feeling without giving physical pain owing to good absorbability of impact pressure.

Moreover, the above fitting composition generally has a paste form and therefore is excellent in handling ability at producing body-worn tools. Thus, it has been found that a polymerized hardened product that fits well the body shape of a wearer can be easily formed by directly applying the fitting composition to the body part to which the body-worn tool is applied. The invention has been accomplished based on these findings.

Namely, the invention relates to:

(1) A fitting composition for body-worn tools to be used in contact with skin comprising:
  (a) a thermoplastic block copolymer having at least one polymer block (A) mainly composed of an aromatic vinyl compound and at least one elastic polymer block (B);
  (b) a (meth)acrylic monomer; and
  (c) a polymerization initiator.

Further, the invention also relates to:

(2) The fitting composition according to the above (1), wherein the number average molecular weight of the polymer block (A) in the block copolymer (a) is from 2,500 to 40,000 and the number average molecular weight of the elastic polymer block (B) is from 10,000 to 300,000.

(3) The fitting composition according to the above (1) or (2), wherein the elastic polymer block (B) in the block copolymer (a) is a polymer block comprising at least one elastic polymer selected from an elastic polymer derived from at least one monomer selected from the group consisting of isoprene, butadiene, isobutylene and butyl acrylate, a hydrogen adduct of the elastic polymer, and an adduct of the elastic polymer with an unsaturated carboxylic acid or an unsaturated carboxylic acid derivative;

(4) The fitting composition according to any one of the above (1) to (3), wherein the elastic polymer block (B) in the block copolymer (a) is a polymer block comprising at least one elastic polymer selected from polyisoprene, polybutadiene and isoprene-butadiene copolymer having a vinyl bond content of 40 mol % or more;

(5) The fitting composition according to any one of the above (1) to (4), wherein the ratio of the polymer block (A)/the elastic polymer block (B) contained in the block copolymer (a) is from 5/95 to 70/30, by weight;

(6) The fitting composition according to any one of the above (1) to (5), which contains 30 to 79.99 wt % of the block copolymer (a), 20 to 69.99 wt% of the (meth)acrylic monomer (b), and 0.01 to 15 wt% of the polymerization initiator (c), based on the total weight of the block copolymer (a), the (meth)acrylic monomer (b), and the polymerization initiator (c);

(7) The fitting composition according to any one of the above (1) to (6), which is a composition for fitting an eyesight-correcting tool or a hearing ability-correcting tool to a body;

(8) A body-worn tool to be used in contact with skin, which is made using the fitting composition according to any one of the above (1) to (7);

(9) The body-worn tool according to the above (8), which is a hearing aid, spectacles, or an artificial limb; and

(10) A method for producing a body-worn tool to be used in contact with skin, comprising the steps of:
  bringing the fitting composition according to any one of claims 1 to 7 into contact closely with closely to the position to which the body-worn tool is attached, preparing parts for the skin-contacting position by hardening the composition as it is, and combining the parts with other parts.

DETAILED DESCRIPTION OF THE INVENTION

The block copolymer (a) for use in the fitting composition of the invention is a block copolymer having a polymer block (A) mainly composed of an aromatic vinyl compound and an elastic polymer block (B), and the copolymer is thermoplastic and melts and/or softens in heat, as well as has elasticity. The block copolymer (a) is a block copolymer wherein one or more polymer blocks (A) and one or more elastic polymer blocks (B) are combined The block copolymer (a) may be, for example, a diblock copolymer wherein one polymer block (A) and one elastic polymer block (B) are combined, a triblock copolymer wherein one polymer block (A) and two elastic polymer blocks (B) are combined, a triblock copolymer wherein two polymer blocks (A) and one elastic polymer block (B) are combined, a tetrablock copolymer wherein two polymer blocks (A) and two elastic polymer blocks (B) are combined, or a polyblock copolymer wherein five or more of polymer blocks (A) and elastic polymer blocks (B) in total are combined. In the block copolymer (a), the polymer block (A) and the elastic polymer block (B) may be combined linearly or may form a star-shaped or branched block structure. Furthermore, the block copolymer (a) may have a tapered combination mode wherein the composition at boundary of each polymer block is gradually changed by random copolymerization.

The polymer block (A) of the block copolymer (a) is mainly composed of an aromatic vinyl compound. The ratio of a structural unit derived from the aromatic vinyl compound is preferably 70 mol % or more, more preferably 80 mol % or more. Examples of the aromatic vinyl compound constituting the polymer block (A) in the block copolymer (a) include styrene, 1-vinylstyrene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl) styrene, and the like. The polymer block (A) may be composed of each homopolymer of these aromatic vinyl compounds, or may be a copolymer of two or more of the aromatic vinyl compounds. Of these, the polymer block (A) is preferably composed of styrene homopolymer or a styrene copolymer having 70 mol % or more, especially 80 mol % or more of a structural unit derived from styrene and 30 mol % or less, especially 20 mol % or less of structural unit(s) derived from the above aromatic vinyl compounds other than styrene and/or other copolymerizable monomers, e.g., olefinic monomers such as ethylene and propylene, vinyl acetate, vinyl chloride, acrylonitrile, (meth)acrylate monomers, and diene monomers. More preferred is a polymer block composed of styrene homopolymer.

In the block copolymer (a), the number average molecular weight of the polymer block (A) is preferably in the range of 2,500 to 40,000. When the number average molecular weight of the polymer block (A) is less than 2,500, it is difficult to obtain a fitting composition excellent in impression. On the other hand, when the number average molecular weight of the polymer block (A) exceeds 40,000, the block copolymer (a) becomes more viscous and difficult to mix homogeneously with the (meth)acylic monomer (b) and the polymerization initiator (c).

By the way, each number average molecular weight of the polymer block and block copolymer is the value measured by GPC in terms of standard polystyrene.

The elastic polymer block (B) in the block copolymer (a) is not particularly limited and may be any polymer block comprising an elastic polymer capable of forming an elastmeric, i.e., elasticity-having block copolymer (a) through combination with the polymer block (A). Thus, it may be a homopolymer of an unsaturated monomer or a copolymer of unsaturated monomers. Of these, the elastic polymer block (B) is preferably composed of an elastic polymer selected from elastic polymers derived from at least one monomer selected from the group consisting of isoprene, butadiene, isobutylene and butyl acrylate, hydrogen adducts of the elastic polymers, and adducts of the elastic polymers with an unsaturated carboxylic acid or an unsaturated carboxylic acid derivative. The elastic polymer block (B) in the block copolymer (a) may be formed from one or more of these elastic polymers.

Examples of the above unsaturated carboxylic acid and its derivative to be used for the modification of the elastic polymer include maleic anhydride, maleic acid, fumaric acid, acrylic acid, itaconic acid, crotonic acid and the like, and the elastic polymer can be modified with one or more of them.

In the elastic polymer block (B) having structural unit(s) derived from isoprene and/or butadiene, vinyl bonds derived from 1,2-bonding or 3,4-bonding occur depending on the polymerization mode of isoprene and butadiene, and these vinyl bonds form ethylenic double bonds in the side chains of the elastic polymer. The ethylenic double bonds in the side chains are highly reactive as compared with the double bonds formed through 1,4-bonding of isoprene or butadiene and present in the main chain of the elastic polymer, and thus copolymerizable with the (meth)acrylate monomer. Therefore, the elastic polymer block (B) having the ethylenic double bonds in the side chains affords a fitting composition excellent in polymerization-hardening ability. In addition, the polymerized hardened product has a small permanent set owing to the formation of chemical cross-linkage, and thus is suitable as a fitting material.

Accordingly, in the block copolymer (a) to be used in the invention, the elastic polymer block (B) preferably comprises at least one elastic polymer selected from polyisoprene, polybutadiene and isoprene-butadiene copolymer and having a vinyl bond (i.e., 1,2-bonding and 3,4-bonding) content of 40 mol % or more.

Incidentally, the vinyl bond (1,2-bonding and 3,4-bonding) content herein means the ratio(mol %) of total of 1,2-bonding and 3,4-bonding relative to total (100%) of 1,2-bonding, 3,4-bonding, and 1,4-bonding in polyisoprene, polybutadiene and/or isoprene-butadiene copolymer which constitute the elastic polymer block (B).

In the block copolymer (a), the number average molecular weight of the elastic polymer block (B) is preferably from 10,000 to 300,000. When the number average molecular weight of the elastic polymer block (B) is less than 10,000, the polymerized hardened product obtained from the fitting composition tends to have a poor fitting ability to body. On the other hand, when the number average molecular weight of the elastic polymer block (B) exceeds 300,000, the block copolymer (a) becomes difficult to mix homogeneously with the (meth)acrylate monomer (b) and the polymerization initiator (c).

The number average molecular weight of total block copolymer (a) is preferably from 25,000 to 500,000. When the number average molecular weight of the block copolymer (a) is less than 25,000, the polymerized hardened product obtained from the fitting composition tends to have a poor fitting ability to the body. On the other hand, when the number average molecular weight of the block copolymer (a) exceeds 500,000, the block copolymer (a) becomes too viscous and difficult to mix homogeneously with the (meth) acrylate monomer (b) and the polymerization initiator (c).

In the block copolymer (a) for use in the invention, the ratio of the polymer block (A)/the elastic polymer block (B) contained in the block copolymer (a) is preferably from 5/95 to 70/30, more preferably from 5/95 to 30/70, by weight. When the content of the polymer block (A) in the block copolymer (a) is less than 5 wt %, i.e., when the content of the elastic polymer block (B) exceeds 95 wt%, the polymerized hardened product obtained from the fitting composition tends to have a poor fitting ability to body. On the other hand, when the content of the polymer block (A) exceeds 70 wt %, i.e., when the content of the elastic polymer block (B) is less than 30 wt %, the block copolymer (a) becomes less compatible to the (meth)acrylate monomer (b) and difficult to mix homogeneously with the monomer.

Examples of the block copolymer (a) preferably used in the invention include an elastomer having polystyrene block and polyisoprene block, an elastomer having polystyrene block and polybutadiene block, an elastomer having polystyrene block and isoprene-butadiene copolymer block, an elastomer having polystyrene block and polyisbbutylene block, an elastomer having polystyrene block and polybutyl acrylate block, and the like.

Among them, particularly preferred is a thermoplastic block copolymer disclosed in Japanese Patent Laid-Open No. 102212/1990, i.e., a thermoplastic block copolymer having total number average molecular weight of 40,000 to 300,000 which has two or more polymer blocks derived from an aromatic vinyl compound and having the number average molecular weight of 3,000 to 40,000, and has one or two polymer block composed of polyisoprene and/or isoprene-butadiene copolymer and having a vinyl bond content of 40 mol % or more. Since the thermoplastic block copolymer is excellent in damping performance in addition to the above abilities, the polymerized hardened product obtained from a fitting composition containing the thermoplastic block copolymer provides a little uncomfortable feeling and is excellent in compatibility to body.

The block copolymer (a) for use in the invention is preferably a copolymer capable of forming a polymerized hardened product having a rubber hardness of 30 to 90, especially 35 to 85 when the fitting composition of the invention containing the copolymer is hardened through polymerization. The rubber hardness herein means a value measured on a durometer A-type in accordance with JIS K 6253.

As the (meth)acrylate monomer (b) for use in the fitting composition of the invention, both of a monofunctional (meth)acrylate ester or a polyfunctional (meth)acryalte ester can be used. Examples of the monofunctional (meth)acryalte ester include alkyl (meth)acrylates wherein the alkyl group has 1 to 20 carbons, such as methyl (meth)acrylate, ethyl (meth)acrylate, butyl (meth)acrylate, hexyl (meth)acrylate, decyl (meth)acrylate, lauryl (meth)acrylate, miristyl (meth) acrylate, and stearyl (meth)acrylate; methoxyethyl (meth) acrylate, 2-phenoxyethyl (meth)acrylate, methoxypolyethylene glycol (meth)acrylate having 2 to 10 of polymerization degree of polyethylene glycol, tetrahydrofurfryl (meth) acrylate, isobornyl (meth)acrylate, undecenyl (meth) acrylate, benzyl (meth)acrylate, 2-hydroxyethyl (meth) acrylate (HEMA), diemethylaminoethyl (meth)acrylate, and the like.

Further, examples of the polyfunctional (meth)acrylate ester include alkylene glycol di(meth)acrylates wherein the alkylene group has 1 to 20 carbons, such as ethylene glycol di(meth)acrylate, propylene glycol di(meth)acrylate, 1,4-butanediol di(meth)acrylate, neopentyl glycol di(meth) acrylate, 1,6-hexanediol di(meth)acrylate, and 1,10-decanediol di(meth)acrylate; polyalkylene glycol di(meth) acrylate wherein the alkylene group has 2 to 4 carbons and the polymerization degree of the polyalkylene glycol part is from 2 to 200, such as diethylene glycol di(meth)acrylate, triethylene glycol di(meth)acrylate, dipropylene glycol di(meth)acrylate, and polyethylene glycol di(meth)acrylate; glycerin di(meth)acrylate, 2,2'-bis[p-(γ-methacryloxy-β-hydroxypropoxy)phenyl]propane (Bis-GMA), bisphenol A dimethacrylate, 2,2'-bis(4-methacryloxypolyethoxyphenyl) propane having 2 to 10 ethoxy groups in one molecule, 1,2-bis(3-methacryloxy-2-hydroxypropyl)butane, trimethylolpropane tri(meth)acrylate, pentaerythritol tetra(meth) acrylate, urethane (meth)acrylate, and the like.

In the invention, one or more of the above (meth)acrylate monomers can be used as the (meth)acrylate monomer (b). Among them, alkyl (meth)acrylates and/or alkylene glycol di(meth)acrylates are suitable owing to their particularly high compatibility to the block copolymer (a). Therefore, the (meth)acrylate monomer (b) for use in the invention preferably contains 40 wt % or more of the alkyl (meth)acrylate and/or alkylene glycol di(meth)acrylate based on the total weight of the (meth)acrylate monomers.

A soft polymerized hardened product is obtained from a fitting composition mainly containing a monofunctional (meth)acrylate having an alkyl or alkenyl group having many carbons, especially 6 carbons or more, e.g., n-hexyl (meth)acrylate, n-lauryl (meth)acrylate, or n-stearyl (meth) acrylate, as the (meth)acrylate monomer (b). On the other hand, a relatively hard polymerized hardened product is obtained from a fitting composition mainly containing a monofunctional (meth)acrylate having an alkyl or alkenyl group having few carbons, e.g., methyl (meth)acrylate or n-butyl (meth)acrylate, as the (meth)acrylate monomer (b). Therefore, depending on the applications or employing modes of the fitting composition, the kind of the (meth) acrylate monomer (b) for use in the fitting composition can be selected so as to have suitable hardness of the polymerized hardened product for each application.

The polymerization initiator (c) for use in the fitting composition of the invention is not particularly limited and may be any compound which can initiate the polymerization of the (meth)acrylate monomer (b). Thus, one or more of polymerization initiators selected from photo-polymerization initiators, thermal polymerization initiators, and chemical polymerization initiators can be used.

As the photo-polymerization initiators, one or more of α-diketones, ketals, thioxanthones, benzoin alkyl ethers, acylphosphine oxidse, and the like, or a combination of one or more of these compounds and reducing agents can be employed.

Specific examples of the α-diketones include camphorquinone, benzil, 2,3-pentanedione, and the like. Specific examples of the ketals include benzyl dimethyl ketal, benzyl diethyl ketal, and the like. Specific examples of the thioxanthones include 2-chlorothioxanthone, 2,4-diethylthioxanthone, and the like. Specific examples 2 of the benzoin alkyl ethers include benzoin methyl ether, benzoin ethyl ether, and the like. Further, specific examples of the acylphosphine oxides include 2,4,6-trimethylbenzoyldiphenylphosphine oxide, 2,6- dimethoxybenzoyldiphenylphosphine oxide, 2,6-dichlorobenzoyldiphenylphosphine oxide, 2,3,5,6-tetramethylbenzoyldiphenylphosphine oxide, benzoyldi-(2,6-dimethytphenyl)phosphonate, 2,4,6-trimethylbenzoylethoxyphenylphosphine oxide, and the like.

Specific examples of the above reducing agent for use in photo-polymerization initiator include tertiary amines such as 2-(dimethylamino)ethyl methacrylate, N,N-bis[(meth)acryloyloxyethyl]-N-methylamine, ethyl 4-dimethylaminobenzoate, butyl 4-dimethylaminobenzoate, 4-dimethylaminobenzophenone, N,N-di(2-hydroxyethyl)-p-toluidine, and dimethylaminophenanthol; aldehydes such as dimethylaminobenzaldehyde and terephthalaldehyde; compounds having thiol group such as 2-mercaptobenzoxazole, decanethiol, 3-mercaptopropyltrimethoxysilane, and thiobenzoic acid; sulfinic acids or salts thereof such as benzenesulfinic acid, sodium benzenesulfinate, potassium benzenesulfinate, toluenesulfinic acid, sodium toluenesulfinate, 2,4,6-trimethylbenzenesulfinic acid, and sodium 2,4,6-trimethylbenzenesulfinate; or the like. One or more of these reducing agents can be used as photo-polymerization initiator in combination with one or more of the compounds such as α-diketones, ketals, thioxanthones, benzoin alkyl ethers, acylphosphine oxidse, and the like.

In the case of carrying out the photo-polymerization under irradiation with ultraviolet ray, among the above photo-polymerization initiators, a benzoin alkyl ether, benzyl dimethyl ketal, or a combination of these compounds with the above reducing agent is suitably employed.

As the thermal polymerization initiators, organic peroxides such as diacyl peroxides, peroxy esters, dialkyl peroxides, peroxy ketals, ketone peroxides, and hydroperoxides is preferably employed. Specific examples of the diacyl peroxides include benzoyl peroxide, 2,4-dichlorobenzoyl peroxide, m-toluyl peroxide, and the like. Specific examples of the peroxy esters include t-butyl peroxybenzoate, bis-t-butyl peroxyisophthalate, 2,5-dimethyl-2,5-bis(benzoylperoxy)hexane, t-butyl peroxy-2-ethylhexanoate, t-butyl peroxyisopropyl carbonate, and the like. Specific examples of the dialkyl peroxides include dicumyl peroxide, di-t-butyl peroxide, and the like. Specific examples of the peroxy ketals include 1,1-bis(t-butylperoxy)-3,3,5-trimethylcyclohexane, and the like. Specific examples of the ketone peroxides include methyl ethyl ketone peroxide, and the like. Specific examples of the hydroperoxides include t-butyl hydroperoxide, and the like.

In the invention, one or more of the above thermal polymerization initiators can be used as the polymerization initiator.

In the case that the fitting composition of the invention contains a thermal polymerization initiator as the polymerization initiator (c), a method wherein the fitting composition is first fixed to a predetermined form and then heated to be hardened through polymerization is preferably adopted.

As the chemical polymerization initiator, preferably usable is a redox-type polymerization initiator such as a combination of an organic peroxide with an amine-type reducing agent or a sulfinic acid or salt-type reducing agent.

As the organic peroxide in the redox-type polymerization initiator, various organic peroxides as described in the above with regard to the thermal polymerization initiator can be used.

Usually, a tertiary amine is suitably used as the above amine-type reducing agent in the redox-type polymerization initiator to be used as the chemical polymerization inintiator.

Specific examples thereof include N,N-diethylaniline, N,N-dimethyl-p-toluidine, N,N-demethyl-m-toluidine, N,N-diethyl-p-toluidine, N,N-dimethyl-3,5-dimethylaniline, N,N-dimethyl-3,4-direthylaniline, N,N-dimethyl-4-ethylaniline, N,N-dimethyl-4-i-propylaniline, N,N-dimethyl-4-t-butylaniline, N,N-dimethyl-3,5-di-t-butylaniline, N,N-di(2-hydroxyethyl)-p-toluidine, N,N-di(2-hydroxyethyl)-3,5-dimethylaniline, N,N-di(2-hydroxyethyl)-3,4-dimethylaniline, N,N-di(2 hydroxyethyl)-4-ethylaniline, N,N-di(2-hydroxyethyl)-4-i-propylaniline, N,N-di(2-hydroxyethyl)-4-t-butylaniline, N,N-di(2-hydroxyethyl)-3,5-di-i-propylaniline, N,N-di(2 hydroxyethyl)-3,5-di-t-butylaniline, ethyl 4-dimethylaminobenzoate, n-butoxyethyl 4-dimethylaminozenzoate, (2-methacryloyloxy)ethyl 4-dimethylaminozenzoate, trimethylamine, triethylamine, N-methyldiethanolamine, N-ethyldiethanolamine, N-n-butyldiethanolamine, N-lauryldiethanolamine, triethanolamine, (2-dimethylamino)ethyl methacryalte, N-methyldiethanolamine dimethacrylate, N-ethyldiethanolamine dimethacrylate, triethanolamine monomethacrylate, triethanolamine dimethacrylate, triethanolamine trimethacrylate, and the like. One or more of them can be used.

Further, specific examples of the above sulfinic acid or salt reducing agent in the redox-type polymerization initiator to be used as the chemical polymerization inintiator include benzenesulfinic acids or salts thereof such as benzenesulfinic acid, sodium benzenesulfinate, potassium benzenesulfinate, toluenesulfinic acid, sodium toluenesulfinate, 2,4,6-trimethylbenzenesulfinic acid, and sodium 2,4,6-trimethylbenzenesulfinate. One or more of them can be used.

In the case of using a chemical polymerization initiator as the polymerization initiator (c), the oxidizing agent such as an organic peroxide and the reducing agent such as a tertiary amine or a sulfinic acid or salt constituting the chemical polymerization initiator should be stored separately before the use of the fitting composition, and both the agents or the components for the composition containing each agent separately are to be mixed at the use of the composition.

The fitting composition of the invention preferably contains 30 to 79.99 wt % of the block copolymer (a), 20 to 69.99 wt % of the (meth)acrylic monomer (b), and 0.01 to 15 wt % of the polymerization initiator (c), based on the total weight of the block copolymer (a), the (meth)acrylic monomer (b), and the polymerization initiator (c) in view of handling ability and filling ability into mold of the fitting composition, and flexibility of the polymerized hardened product. The composition contains, more preferably, 40 to 69.9 wt % of the block copolymer (a), 30 to 59.9 wt % of the (meth)acrylic monomer (b), and 0.1 to 10 i; wt % of the polymerization initiator (c), and further preferably, 50 to 59.9 wt % of the block copolymer (a), 40 to 49.9 wt % of the (meth)acrylic monomer (b), and 0.1 to 10 wt % of the polymerization initiator (c).

The fitting composition of the invention may contain 30 wt % or less of a polymer other than the block copolymer (a) based on the total weight of the fitting composition, if necessary, for adjusting the viscosity of the composition or physical properties of the polymerized hardened product, or for other purposes. As such a polymer, any polymer which does not harm the physical properties of the fitting composition can be used without limitation. Examples thereof include elastomers such as isoprene rubber, butadiene rubber, styrene-butadiene random copoymer rubber, hyrogenated styrene-butadiene random copoymer rubber, chloroprene rubber, nitrile rubber, butyl rubber, ethylene-propylene copolymer rubber, chlorosulfonated polyethylene, acrylic rubber, epichlorohydrin rubber, polysulfide rubber, silicone rubber, polyurethane-type thermoplastic elastomer, polyester-type thermoplastic elastomer, polyamide-type thermoplastic elastomer, 1,2-polybutadiene-type thermoplastic elastomer, ethylene-vinyl acetate copolymer-type thermoplastic elastomer, and polyvinyl chloride-type thermoplastic elastomer; polyethylene, polypropylene, polyvinyl chloride resin, polystyrene, polymethyl methacrylate, polyethyl methacrylate, polybutyl methacrylate, polyvinyl acetate, polycarbonates, polyurethanes, polychloroprene resin, polyvinyl fluoride, polyethylene oxide, polyoxymethylene, polyacrylonitrile, polyvinyl alcohol, polyvinylidene chloride, polyvinylidene fluoride, cellulose, polyesters, polyamides, cellulose acetate, and the like. The fitting composition of the invention can contain one or more of these polymers. The fitting composition may contain one or more of these polymers.

The fitting composition of the invention may contain a small amount of a polymerization inhibitor such as hydroquinone, hydroquinone monomethyl ether, or butylhydroxyltoluene, if necessary, for the purpose of preventing the polymerization during storage. Also, the fitting composition of the invention may contain a small .amount of an antioxidant and a photostabilizer for enhancing the stability of the block copolymer (a). Furthermore, the fitting composition of the invention may contain a lubricant, a surfactant, an inorganic filler, a plasticizer, or the like, if necessary, for adjusting the fitting composition and its hardened product more suitably depending on each application and employing mode. Moreover, the fitting composition of the invention may contain a pigment, a dye, a fiber for reinforcement, or the like.

The fitting composition of the invention is usually provided in a paste form. The method for preparing the fitting composition is not particularly limited and it can be prepared by adopting a known mixing process or mixing and kneading process, for example, melt-kneading process or a kneading process using a solvent. Specifically, the method includes, for example, a process of mixing and kneading the block copolymer (a), the (meth)acrylate monomer (b), the polymerization initiator (c), and optional other component (s) using laboratory plastomill (manufactured by Toyo Seiki K. K.) or other kneading apparatus, a process of dissolving the block copolymer (a), the (meth)acrylate monomer (b), the polymerization initiator (c), and optional other component(s) into an organic solvent such as toluene or methylene chloride, mixing the mixture homogeneously, and successively removing the organic solvent, and other processes. In general, the kneading process using no organic solvent is preferable in view of safety and sanitary aspect as well as no necessity of removal of the organic solvent after the mixing owing to the use of no organic solvent. The paste-form composition obtained by mixing each component is preferably subjected to defoaming treatment through evacuation or suction.

At producing body-worn tools to be used in contact with skin, such as a hearing ability-correcting tool including a hearing aid, an eyesight-correcting tool including spectacles, or an artificial limb, the paste-form fitting composition of the invention can be banked surrounding the hardware circuit board of a hearing aid, and, after the adjustment of the shape by directly inserting it into an ear hole, hardened through polymerization by irradiation with a light to complete the production of the hearing aid. Thus, one of the most important characteristics of the body-worn tool using the fitting composition of the invention is that it can be directly produced without using a mold.

At producing a body-worn tool using the fitting composition of the invention, the above direct production is an important characteristic, but any conventional method for producing a body-worn tool using a plastic material may also be applied for the production.

Although no limitation is intended, the method for producing an ear hole-type hearing aid may be exemplified by the following. The preparation of the hearing aid can be completed by, first, making a cast of the ear hole of a wearer by inserting a silicone putty material or the like into the ear hole, preparing a female mold having an ear hole-shape cavity by applying agar, gypsum, or other molding material to the outer surface of the cast and solidifying the material, preparing a shell part of the m hearing aid by applying the paste-form fitting composition of the invention to the inner surface of the female mold at a predetermined thickness and hardening the composition through polymerization, then installing a hardware circuit board for the hearing aid inside the shell, and adjusting the shape.

A method similar to the method for producing the hearing aid can be adopted for the production of other body-worn tools such as spectacles and artificial limbs.

Since the fitting composition of the invention usually has a paste-form, it is extremely excellent in handling ability at the production of the shell part of a hearing aid. Namely, in the case of using the fitting composition of the invention, complex steps are not required, the steps comprising "forming a wall by applying a thermally fusible material to the inner surface of the female mold, which is prepared so as to have an ear hole-shape cavity, at a predetermined thickness and solidifying the material, forming an intermediate by filling the inside of the solidified wall of the thermally fusible material with a resin and solidifying or hardening the resin, removing the wall made of the thermally fusible material applied between the female mold and the intermediate, and preparing a shell for the hearing aid by introducing a soft resin such as plasticized polyvinyl chloride resin into the cavity for forming the shell formed by the removal of the wall between the female mold and the intermediate and solidifying the resin", as described in Japanese Patent Laid-Open No. 296900/1986, but the shell part of the hearing aid can be produced by simply applying the paste-form fitting composition of the invention into a female mold having an ear hole-shape cavity and hardening the composition through polymerization by irradiation with a light, by heating and/or by a chemical reaction. In addition, it is not always necessary to prepare the female mold having an ear hole-shape cavity with a light-transparent material as in the method disclosed in Japanese Patent Laid-Open No. 130697/1993.

The fitting composition of the invention affords a polymerized hardened product having an appropriate rubber elasticity owing to the incorporation of the above specific block copolymer (a), and the elasticity is maintained for a long period of time. Therefore, the fitting composition of the invention is suitably used as a fitting material for obtaining optimal adjustment of a hearing ability-correcting tool including a hearing aid, a eyesight-correcting tool including spectacles, an artificial limb, or other body-worn tool to the body shape of a wearer. By the way, although the above description mainly explained an ear hole-type hearing aid, the fitting composition of the invention can be suitably used not only in the production of the shell of the ear hole-type hearing aid but also in the production of the parts of ear-hanging type or spectacle type hearing aids, the parts being necessary to fit to body.

For the body-worn tools obtained by applying the fitting composition of the invention to a body-fitting part and hardening the composition through polymerization, the hardness of the polymerized hardened product is preferably from 30 to 90, especially from 35 to 85 on the durometer A-type in accordance with JIS K 6253 described above.

The following will explain the invention in detail with reference to Examples, but the invention is not limited to following Examples. In following Examples, the rubber hardness and sliding resistance of the polymerized hardened product obtained by hardening the fitting composition through polymerization in each Example were measured as follows.

Rubber Hardness of Hardened Product

A fitting composition was filled into a mold having a cylindrical cavity of 10 cm of diameter and 10 mm of thickness and then irradiated with a light by means of a light irradiator, "α-light" manufactured by K. K. Morita Tokyo Factory (output: a 150 W halogen lamp×6), from the position about 5 cm apart from the central upper surface of the mold for 10 minutes to harden the composition through polymerization. Test pieces in accordance to JIS K 6253 were cut from the resulting hardened product, immersed in water at 37° C. for 1 day, and taken out, and then the rubber hardness was measured on a durometer A-type testing machine manufactured by Koubunshi Keiki in accordance with JIS K 6253.

Sliding Resistance of Hardened Product (i) A fitting composition was applied all over the surface of an acrylic plate having a width of 30 mm, a length of 100 mm and a thickness of 3 mm, so as to make the thickness of the composition about 1 mm. The composition on the plate was hardened through polymerization by irradiating with a light by means of a light irradiator, "α-light" manufactured by K. K. Morita Tokyo Factory (output: a 150 W halogen lamp×5), from the position about 5 cm apart from the central upper surface of the acrylic plate for 10 minutes.

(ii) A stainless steel mirror-finished disk having a diameter of 20 mm and a weight of 5 g was placed at the central part of the polymerized hardened product layer on the laminated plate composed of the acrylic plate and the hardened layer of the fitting composition obtained in the above (i). Then, one end of the laminated plate was picked up and inclined at a rate of 10°/minute, while another end was kept at the ground position. The sliding resistance of the polymerized hardened product was evaluated by measuring the angle at which the stainless steel disk began to slide. The larger the angle is, the higher the sliding resistance is.

REFERENCE EXAMPLE 1

Synthesis of Block Copolymer SIS-(1)

In a pressure vessel purged with dry nitrogen gas, styrene was polymerized at 60° C. according to a usual method using cyclohexane as a solvent and sec-butyllithium as a polymerization initiator. Then, N,N,N',N'-tetramethylethylenediamine (TMEDA) was added thereto, and isoprene and styrene were polymerized, successively. Thereafter, methanol was added thereto to terminate the polymerization. Then, the solution containing polymerized products was poured into methanol to precipitate a block copolymer. The block copolymer precipitated was separated and recovered and then dried under a reduced pressure to obtain a polystyrene-polyisoprene-polystyrene triblock copolymer, a block copolymer SIS-(1).

Following Table 1 shows the number average molecular weight of each polystyrene block in the block copolymer SIS-(1) thus obtained, the number average molecular weight of total block copolymer SIS-(1), styrene content, and vinyl bond content.

REFERENCE EXAMPLE 2

Synthesis of Block Copolymer SIS-(2)

Polymerization and post-treatment were carried out in a similar manner to Reference Example 1 with the exception of using tetrahydrofuran instead of TMEDA to obtain a polystyrene-polyisoprene-polystyrene triblock copolymer, a block copolymer SIS-(2).

Following Table 1 shows the number average molecular weight of each polystyrene block in the block copolymer SIS-(2) thus obtained, the number average molecular weight of total block copolymer SIS-(2), styrene content, and vinyl bond content.

REFERENCE EXAMPLE 3

Synthesis of Block Copolymer SIS-(3)

Polymerization and post-treatment were carried out in a similar manner to Reference Example 1 with the exception of using no TMEDA to obtain a polystyrene-polyisoprene-polystyrene triblock copolymer, a block copolymer SIS-(3).

Following Table 1 shows the number average molecular weight of each polystyrene block in the block copolymer SIS-(3) thus obtained, the number average molecular weight of total block copolymer SIS-(3), styrene content, and vinyl bond content.

REFERENCE EXAMPLE 4

Synthesis of Block Copolymer SBS-(1)

Polymerization and post-treatment were carried out in a similar manner to Reference Example 3 with the exception of using butadiene instead of isoprene to obtain a polystyrene-polybutadiene-polystyrene triblock copolymer, a block copolymer SBS-(1)).

Following Table 1 shows the number average molecular weight of each polystyrene block in the block copolymer SBS-(1) thus obtained, the number average molecular weight of total block copolymer SBS-(1), styrene content, and vinyl bond content.

TABLE 1

| | Reference Example 1 | Reference Example 2 | Reference Example 3 | Reference Example 4 |
|---|---|---|---|---|
| Kind of block copolymer | SIS-(1) | SIS-(2) | SIS-(3) | SBS-(1) |
| Mn of polystyrene block | 8,100 | 8,200 | 7,900 | 6,800 |
| Mn of total block copolymer | 108,600 | 108,400 | 112,700 | 118,200 |
| Styrene content (wt %) | 20 | 20 | 20 | 20 |
| Vinyl bond content (mol %) | 72 | 54 | 7 | 9 |

EXAMPLE 1

Preparation of Fitting Composition (1) A paste-form fitting composition was prepared by mixing 60 g of the block copolymer SIS-(1) obtained in Reference Example 1, 39 g of n-lauryl methacrylate, 1 g of 1,6-hexanediol dimethacrylate, 0.5 g of camphorquinone, 0.5 g of 2-dimethylaminoethyl methacrylate, and 0.5 g of benzoyl peroxide at ambient temperature to dissolve the block copolymer SIS-(1) in methacrylate monomers.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 2

Preparation of Fitting Composition (1) A paste-form fitting composition was prepared by mixing 60 g of the block copolymer SBS-(1) obtained in Reference Example 4, 40 g of 2-ethylhexyl methacrylate, 1.0 g of camphorquinone, and 1.0 g of 2-dimethylaminoethyl by methacrylate at ambient temperature to dissolve the block copolymer SBS-(1) in methacrylate monomers.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 3

Preparation of Fitting Composition (1) A paste-form fitting composition was prepared by mixing 60 g of the block copolymer SIS-(1) obtained in Reference Example 1, 38 g of isodecyl methacrylate, 2 g of 1,6-hexanediol dimethacrylate, and 1.0 g of 2,4,6-trimethylbenzoyldiphenylphosphine oxide at ambient temperature to dissolve the block copolymer SIS-(1) in methacrylate monomers.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 4

Preparation of Fitting Composition (1) A paste-form fitting composition was prepared by mixing 60 g of the block copolymer SIS-(1) obtained in Reference Example 1, 38 g of tridecyl methacrylate, 2 g of 1,6-hexanediol dimethacrylate, 0.5 g of camphorquinone, 0.5 g of 2-dimethylaminoethyl methacrylate, 0.5 g of benzoyl peroxide, and about 100 ml of methylene chloride, an organic solvent at ambient temperature to prepare a solution-type mixture, followed by evaporation and removal of the organic solvent.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 5

Preparation of Fitting Composition (1) A paste-form fitting composition was prepared by mixing 60 g of the block copolymer SIS-(2) obtained in Reference Example 2, 38 g of n-lauryl methacrylate, 2 g of 1,6-hexanediol dimethacrylate, 0.5 g of camphorquinone, 0.5 g of 2-dimethylaminoethyl methacrylate, and 0.5 g of benzoyl peroxide at ambient temperature to dissolve the block copolymer SIS-(1) in methacrylate monomers.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 6

Preparation of Fitting Composition (1) A paste-form fitting composition was prepared by mixing 60 g of the block copolymer SIS-(1) obtained in Reference Example 1, 38 g of n-lauryl methacrylate, 2 g of 1,6-hexanediol dimethacrylate, 0.5 g of camphorquinone, and 0.5 g of 2-dimethylaminoethyl methacrylate at ambient temperature to dissolve the block copolymer SIS-(1) in methacrylate monomers.

(2) Using the fitting composition obtained in the above (1), a polymerized hardened product was produced by hardening the composition through polymerization according to the-above method, i.e., the method described in the paragraphs of measurement of rubber hardness and measurement of sliding resistance. The rubber hardness and sliding resistance of the product measured are shown in the following Table 2.

EXAMPLE 7

Preparation of Fitting Composition (1) A paste-form fitting composition was prepared by mixing 60 g of the block copolymer SIS-(1) obtained in Reference Example 1, 6 g of polyethyl methacrylate manufactured by Negami Kogyo, 38 g of n-lauryl methacrylate, 2 g of 1,6-hexanediol dimethacrylate, 0.5 g of 2,4,6-trimethylbenzoyldiphenylphosphine oxide, 0.5 g of camphorquinone, and 0.5 g of 2-dimethylaminoethyl methacrylate at ambient temperature to dissolve the block copolymer SIS-(1) in methacrylate monomers.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 8

Preparation of Fitting Composition (1) A paste-form fitting composition was prepared by mixing 60 g of the block copolymer SIS-(1) obtained in Reference Example 1, 20 g of triethylene glycol dimethacrylate manufactured by Shin-Nakamura Chemical Co. Ltd., 20 g of 1,6-hexanediol dimethacrylate, 0.5 g of camphorquinone, and 1.0 g of 2-dimethylaminoethyl methacrylate at ambient temperature to dissolve the block copolymer SIS-(1) in methacrylate monomers.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

EXAMPLE 9

Preparation of Fitting Composition (1) A block copolymer SIS-(3) modified with maleic anhydride was produced by adding 2 g of maleic anhydride to 50 g of the block copolymer SIS-(3) obtained in Reference Example 3 and reacting them at 150° C. at 80 rpm for 30 minutes using Plasti-Corder manufactured by Brabender.

(2) A paste-form fitting composition was prepared by mixing 30 g of the maleic anhydride-modified block copolymer SIS-(3) obtained in the above (1), 30 g of the block copolymer SBS-(1), 38 g of n-lauryl methacrylate, 2 g of 1,6-hexanediol dimethacrylate, 0.5 g of camphorquinone, 0.5 g of 2-dimethylaminoethyl methacrylate, and 0.5 g of benzoyl peroxide at ambient temperature to dissolve the maleic anhydride-modified block copolymer SIS-(3) and the block copolymer SBS-(1) in methacrylate monomers.

(3) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

COMPARATIVE EXAMPLE 1

A polymerized hardened product was produced in a similar manner to the above test method, i.e., the method described in the paragraphs of measurement of rubber hardness and measurement of sliding resistance, with the exception that polymerization was carried out chemically without no light irradiation using a commercial shell material for hearing aid, a chemically polymerizable paste-form composition for hearing aid shell mainly composed of polymethyl methacrylate and methyl methacrylate manufactured by Starkey Japan. The rubber hardness and sliding resistance of the product measured in a similar manner are shown in the following Table 2.

COMPARATIVE EXAMPLE 2

(1) A photosetting resin composition similar to the composition described in Example of Japanese Patent Laid-Open No. 130697/1993 was prepared, the composition being composed of 40 g of a urethane acrylate, 60 g of triethylene glycol dimethacrylate, 1 g of camphorquinone, 1 g of N,N-dimethylaminoethyl methacrylate, and 5 g of titanium dioxide. Therein was used phenylglycidyl ether acrylate hexamethylene diisocyanate urethane prepolymer as the urethane acrylate. A polymerized hardened product was produced in a similar manner to above Example. The rubber hardness and sliding resistance of the product measured were 100 and 40, respectively. Thus, the composition afforded a harder and more slippery polymer than the composition of the invention afforded.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

COMPARATIVE EXAMPLE 3

(1) A photosetting resin composition similar to the composition described in Example of Japanese Patent Laid-Open No. 130697/1993 was prepared, the composition being composed of 40 g of a urethane acrylate, 60 g of triethylene glycol dimethacrylate, 1 g of camphorquinone, 1 of N,N-dimethylaminoethyl methacrylate, and 5 g of titanium dioxide. Therein was used glycerin dimethacrylate tolylene diisocyanate urethane prepolymer as the urethane acrylate. A polymerized hardened product was produced in a similar manner to above Example. The rubber hardness and sliding resistance of the product measured were 100 and 45, respectively. Thus, the composition afforded a harder and more slippery-polymer than the composition of the invention afforded.

(2) Using the fitting composition obtained in the above (1), a polymerized hardened product was produced by hardening the composition through polymerization according to the above method, i.e., the method described in the paragraphs of measurement of rubber hardness and measurement of sliding resistance. The rubber hardness and sliding resistance of the product measured are shown in the following Table 2.

TABLE 2

|   | Rubber hardness | Sliding resistance (angle at which sliding starts) |
|---|---|---|
| Example 1 | 40 | 85° |
| Example 2 | 42 | 83° |
| Example 3 | 60 | 78° |
| Example 4 | 56 | 80° |
| Example 5 | 45 | 85° |
| Example 6 | 37 | 84° |
| Example 7 | 70 | 75° |
| Example 8 | 80 | 70° |
| Example 9 | 52 | 85° |
| Comparative Example 1 | 100 | 15° |
| Comparative Example 2 | 100 | 40° |
| Comparative Example 3 | 100 | 45° |

From the results shown in above Table 2, it is found that the polymerized hardened products obtained by hardening the fitting compositions of Examples 1 to 9 has a rubber elasticity and a high slipping resistance, are excellent in wear-feeling, and hardly come off a wearing part of body. On the contrary, in the case of the conventional commercial compositions for hearing aid shell (Comparative Example 1) and a photosetting resin composition similar to the composition described in Example of Japanese Patent Laid-Open No. 130697/1993 (Comparative Examples 2 and 3), the polymerized hardened products are hard and have no rubber elasticity and a low slipping resistance, and thus they are inferior in wear-feeling and easily come off a wearing part of body.

EXAMPLE 10

Preparation of Hearing Aid (1) A silicone putty material was inserted into the ear hole of a person who is hard of hearing to make a cast of an ear hole shape, and then agar was applied to the outer surface of the cast and solidifying the material to prepare a female mold having an ear hole-shape cavity. The paste-form fitting composition of Example 1 was applied to the inner surface of the female mold at a thickness of about 1.5 mm and then irradiated with a light by means of a light irradiator, "α-light" manufactured by K. K. Morita Tokyo Factory (output: a 150 W halogen lamp×5), from the position about 5 cm apart from the central upper surface of the mold for 5 minutes to harden the composition through polymerization, and thus a hearing aid shell having a thickness of about 1.5 mm was produced.

(2) A hardware circuit board for the hearing aid manufactured by K. K. Waidex was installed inside the shell and the shape was adjusted to complete the preparation of a hearing aid.

(3) When the hearing aid prepared in the above (2) was attached to the ear hole of the subject person who is hard of hearing, it fitted the ear hole with good accuracy and did not easily come off, and it could sufficiently help the person's hearing ability without troubles such as howling. Also, it was excellent in wear-feeling.

COMPARATIVE EXAMPLE 4

Preparation of hearing aid (1) A hearing aid shell was prepared in a similar manner to Example 10 using a photosetting resin composition similar to the composition described in Example of Japanese Patent Laid-Open No. 130697/1993, the composition being composed of 40 parts of a urethane acrylate, 60 parts of triethylene glycol dimethacrylate, 1 part of camphorquinone, 1 part of N,N-dimethylaminoethyl methacrylate, and 5 parts of titanium dioxide. A hardware circuit board for the hearing aid manufactured by K. K. Waidex was installed inside the shell and the shape was adjusted to complete the preparation of a hearing aid.

(2) When the hearing aid prepared in the above (1) as attached to the ear hole of the subject person who is hard of hearing, it was inferior in wear-feeling and it was difficult to realize fully the function of the hearing aid because the shell of the hearing aid was hard and slippery.

EXAMPLE 11

(1) The paste-form fitting composition of Example 3 was banked at the parts corresponding to nose-fitting parts of spectacles and ear-hanging parts of spectacle bows. Then, the spectacles were attached to an eye-correcting subject person and the shape was adjusted so as to fit the spectacles to the body shape of the wearer. Thereafter, the composition was irradiated with a light by means of the same light irradiator for 5 minutes to harden it through polymerization. Then, the spectacles were detached from the body and the shape was finally adjusted.

(2) The spectacles having a hardened fitting material at the ear-hanging parts and nose-fitting parts obtained in the above (1) fitted well the head/face and did not occur slippage, so that the spectacles could sufficiently correct the person's eyesight. In addition, the touch to the skin was soft and the spectacles were excellent in wear-feeling owing to the rubber elasticity of the polymerized hardened fitting material.

EXAMPLE 12

(1) At the preparation of an artificial limb, the paste-form fitting composition of Example 3 was banked on the wound surface at the leg and then photo-polymerized by means of the light irradiator in a similar manner to Example 10 to obtain a hardened product for the artificial limb.

(2) The artificial limb prepared by arranging the polymerized hardened product obtained in (1) above to the part of the artificial limb to be in contact with wounded face had excellent wear-feeling because of the excellent absorbability of impact pressure at the part where severe pain tended to occur owing to the load of body weight.

When body-worn tools such as spectacles, a hearing aid, and an artificial limb are produced using the fitting composition of the invention, these body-worn tools can fit the body shape of individual wearer without slippage at the body part or coming off the body part to which the tool is attached and thereby realize sufficiently the original function of the body-worn tool in a steady state.

Furthermore, the body-worn tools produced using the fitting composition of the invention can provide an excellent wear-feeling because the fitting composition hardens through polymerization to form a hardened product having a rubber elasticity.

In particular, an ear hole-type hearing aid having a shell formed using the fitting composition of the invention has a high fitting accuracy to ear hole without coming off through loosening during the use or without occurrence of excessive deformation and with no occurrence of howling owing to acoustic leakage, and provides an excellent wear-feeling.

When the nose-fitting parts of spectacles and ear-hanging parts of the bows are formed using the fitting composition of the invention, slippage or coming-off of the spectacles can be prevented and thereby the lenses can be maintained at a proper position for correcting eyesight. Accordingly, eye fatigue, headache, decrease of eyesight, which may be resulted from the deviation of position of the lenses, do not occur.

Moreover, in the case of using the fitting composition for an artificial limb, for example, there is provided a sufficient fitting to the body parts to which the artificial limb is attached, and a sufficient function of the limb can be realized. The artificial limb is excellent in wear-feeling without giving physical pain.

In addition, since the fitting composition of the invention generally has a paste-form and a shape-maintaining ability even before the hardening through polymerization, the composition is excellent in handling ability at preparing fitting members, and a polymerized hardened product that fits the body shape of wearer well can be easily formed without carrying out complex processes.

While the invention has been described in detail and with reference to specific embodiments thereof, it will be apparent to one skilled in the art that various changes and modifications can be made therein without departing from the spirit and scope thereof.

This application is based on Japanese patent applications No. 2000-187637 filed on Jun. 22, 2000, the entire contents thereof being hereby incorporated by reference.

What is claimed is:

1. A body-worn tool obtained from a fitting composition comprising:
   (a) 30 to 79.99 wt % of a thermoplastic block copolymer having at least one polymer block (A) mainly composed of an aromatic vinyl compound and at least one elastic polymer block (B);
   (b) 20 to 69.99 wt % of a (meth)acrylic monomer; and
   (c) 0.01 to 15 wt % of a polymerization initiator, based on the total weight of the block copolymer (a), the (meth) acrylic monomer (b), and the polymerization initiator (c), which body-worn tool is a hearing aid, spectacles, or an artificial limb.

2. The body-worn tool according to claim 1, wherein the number average molecular weight of the polymer block (A) in the block copolymer (a) is from 2,500 to 40,000 and the number average molecular weight of the elastic polymer block (B) is from 10,000 to 300,000.

3. The body-worn tool according to claim 1, wherein the elastic polymer block (B) in the block copolymer (a) is a polymer block comprising at least one elastic polymer selected from an elastic polymer derived from at least one monomer selected from the group consisting of isoprene, butadiene, isobutylene and butyl acrylate, a hydrogen adduct of said elastic polymer, and an adduct of said elastic polymer with an unsaturated carboxylic acid or an unsaturated carboxylic acid derivative.

4. The body-worn tool according to claim 1, wherein the elastic polymer block (B) in the block copolymer (a) is a polymer block comprising at least one elastic polymer selected from polyisoprene, polybutadiene and isoprene-butadiene copolymer having a vinyl bond content of 40 mol % or more.

5. The body-worn tool according to claim 1, wherein the ratio of the polymer block (A)/the elastic polymer block (B) contained in the block copolymer (a) is from 5/195 to 70/30, weight.

6. A method for producing a body-worn tool to be used in contact with skin, comprising the steps of:
   bringing a fitting composition comprising:
      (a) 30 to 79.99 wt % of a thermoplastic block copolymer having at least one polymer block (A) mainly composed of an aromatic vinyl compound and at least one elastic polymer block (B);
      (b) 20 to 69.99 wt % of a (meth)acrylic monomer; and
      (c) 0.01 to 15 wt % of a polymerization initiator, based on the total weight of the block copolymer (a), the (meth)acrylic monomer (b), and the polymerization initiator (c), into contact closely with the position to which the body-worn tool is attached,
   preparing parts for the skin-contacting position by hardening the composition as it is, and
   combining the parts with other parts.

7. The body-worn tool according to claim 2, wherein the elastic polymer block (B) in the block copolymer (a) is a polymer block comprising at least one elastic polymer selected from an elastic polymer derived from at least one monomer selected from the group consisting of isoprene, butadiene, isobutylene and butyl acrylate, a hydrogen adduct of said elastic polymer, and an adduct of said elastic polymer with an unsaturated carboxylic acid or an unsaturated carboxylic acid derivative.

8. The body-worn tool according to claim 2, wherein the elastic polymer block (B) in the block copolymer (a) is a polymer block comprising at least one elastic polymer selected from polyisoprene, polybutadiene and isoprene-butadiene copolymer having a vinyl bond content of 40 mol % or more.

9. The body-worn tool according to claim 2, wherein the ratio of the polymer block (A)/the elastic polymer block (B) contained in the block copolymer (a) is from 5/95 to 70/30, by weight.

10. The body-worn tool according to claim 3, wherein the elastic polymer block (B) in the block copolymer (a) is a polymer block comprising at least one elastic polymer selected from polyisoprene, polybutadiene and isoprene-butadiene copolymer having a vinyl bond content of 40 mol % or more.

11. The body-worn tool according to claim 3, wherein the ratio of the polymer block (A)/the elastic polymer block (B) contained in the block copolymer (a) is from 5/95 to 70/30, by weight.

12. The body-worn tool according to claim 4, wherein the ratio of the polymer block (A)/the elastic polymer block (B) contained in the block copolymer (a) is from 5/95 to 70/30, by weight.

* * * * *